(12) United States Patent
Ohmi et al.

(10) Patent No.: US 7,334,769 B2
(45) Date of Patent: Feb. 26, 2008

(54) RESIN MOLDING MACHINE AND MEMBER FOR RESIN MOLDING MACHINE HAVING FILM IN PASSIVE STATE

(75) Inventors: Tadahiro Ohmi, 1-17-301, Komegafukuro 2-chome, Aoba-ku, Sendai-shi, Miyagi (JP); Masafumi Kitano, Miyagi (JP); Naoki Tanahashi, Miyagi (JP)

(73) Assignee: Tadahiro Ohmi, Miyagi (JP)

( * ) Notice: Subject to any disclaimer, the term of this patent is extended or adjusted under 35 U.S.C. 154(b) by 0 days.

(21) Appl. No.: 10/547,696

(22) PCT Filed: Feb. 26, 2004

(86) PCT No.: PCT/JP2004/002263

§ 371 (c)(1),
(2), (4) Date: Oct. 26, 2005

(87) PCT Pub. No.: WO2004/078447

PCT Pub. Date: Sep. 16, 2004

(65) Prior Publication Data
US 2006/0193940 A1    Aug. 31, 2006

(30) Foreign Application Priority Data
Mar. 3, 2003    (JP)    ............................. 2003-055909

(51) Int. Cl.
B29D 11/00    (2006.01)
(52) U.S. Cl. ..................... 249/134; 425/542; 425/808
(58) Field of Classification Search .................. 249/80, 249/87, 134, 114.1, 116, 135; 164/21; 359/581, 359/585; 427/126.4, 407.2; 425/65, 92, 425/97, 133.5, 149, 516, 542, 587, 808, 470; 65/60.5, 60.4, 447, 443, 26, 29.14, 491, 33.1
See application file for complete search history.

(56) References Cited

U.S. PATENT DOCUMENTS

| | | | |
|---|---|---|---|
| 2,279,253 A * | 4/1942 | Slunder | 249/115 |
| 2,343,205 A * | 2/1944 | Pudelko | 264/317 |
| 3,213,491 A * | 10/1965 | Craig | 425/78 |
| 3,427,689 A * | 2/1969 | Windecker | 425/90 |
| 3,973,750 A * | 8/1976 | Rabinovitch et al. | 249/114.1 |
| 4,120,930 A * | 10/1978 | Lemelson | 264/225 |
| 4,254,065 A * | 3/1981 | Ratkowski | 264/2.5 |
| 4,262,875 A * | 4/1981 | Nyman et al. | 249/114.1 |
| 4,425,411 A * | 1/1984 | Textor et al. | 428/702 |
| 4,715,879 A * | 12/1987 | Schmitte et al. | 65/60.2 |
| 5,275,547 A * | 1/1994 | Brown | 425/129.1 |
| 5,318,091 A * | 6/1994 | Pavoni et al. | 164/6 |

(Continued)

FOREIGN PATENT DOCUMENTS

GB    543767    3/1942

(Continued)

OTHER PUBLICATIONS

European Search Report dated Jul. 3, 2007.

*Primary Examiner*—Yogendra N. Gupta
*Assistant Examiner*—Dimple N. Bodawala
(74) *Attorney, Agent, or Firm*—Foley & Lardner LLP

(57)    ABSTRACT

A member for a resin molding machine wherein it has a face contacting with a molten resin, and at least a part of the face is covered with a film of an oxide of a base material of the face or a component contained in the base material. The use of the member in the molding of a resin allows the prevention of the incorporation of a contaminant associated with the deterioration of a melt of the resin into a molded article from the resin.

13 Claims, 3 Drawing Sheets

U.S. PATENT DOCUMENTS

| | | | |
|---|---|---|---|
| 5,362,226 A * | 11/1994 | Kataoka et al. | 425/526 |
| 5,468,141 A * | 11/1995 | Iwami et al. | 425/542 |
| 5,535,980 A * | 7/1996 | Baumgartner et al. | 249/114.1 |
| 5,609,922 A * | 3/1997 | McDonald | 427/447 |
| 5,741,446 A * | 4/1998 | Tahara et al. | 264/1.9 |
| 5,773,047 A * | 6/1998 | Cloud | 425/403 |
| 5,837,182 A * | 11/1998 | Hiroki et al. | 264/318 |
| 5,843,200 A * | 12/1998 | Richards | 65/102 |
| 6,003,832 A * | 12/1999 | Ueno et al. | 249/135 |
| 6,165,407 A * | 12/2000 | Tahara et al. | 264/328.1 |
| 6,216,491 B1 * | 4/2001 | Fehlner | 65/25.3 |
| 6,271,288 B1 * | 8/2001 | Yamaguchi et al. | 524/37 |
| 6,280,660 B1 * | 8/2001 | Takakuwa et al. | 264/1.33 |
| 6,499,715 B1 * | 12/2002 | Furuya et al. | 249/80 |
| 6,513,360 B1 * | 2/2003 | Ito et al. | 72/462 |
| 6,591,636 B1 * | 7/2003 | Forenz et al. | 65/374.11 |
| 6,616,440 B2 * | 9/2003 | Wang et al. | 425/542 |
| 6,649,549 B2 * | 11/2003 | Nagata et al. | 501/5 |
| 2001/0023597 A1 * | 9/2001 | Elledge | 65/60.5 |
| 2003/0099794 A1 * | 5/2003 | Sasaki et al. | 428/35.7 |
| 2003/0164562 A1 * | 9/2003 | Li et al. | 264/1.32 |
| 2004/0253334 A1 * | 12/2004 | Bandoh et al. | 425/117 |
| 2005/0173834 A1 * | 8/2005 | Lucek et al. | 264/319 |

FOREIGN PATENT DOCUMENTS

| | | |
|---|---|---|
| JP | 56-115236 A | 9/1981 |
| JP | 61-271302 A | 12/1986 |
| JP | 50-24097 A | 2/1993 |
| JP | 11-277606 A | 10/1999 |

* cited by examiner

RESIN MOLDING MACHINE AND MEMBER FOR RESIN MOLDING MACHINE HAVING FILM IN PASSIVE STATE

TECHNICAL FIELD

This invention relates to a resin molding machine and, in particular, relates to an improvement in a member for the resin molding machine.

BACKGROUND ART

Following the development of the light/laser technology, transparent resin materials have been used for optical members such as optical lenses, prisms, and light guides for which transparent materials such as glass have been used. Resin optical materials are lighter than glass. Further, the resin optical materials have an advantage in that it is possible to easily mass-produce optical members having non-curved surfaces or complicated fine shapes that have been difficult with glass. For this reason, the optical devices using the resin optical materials have been remarkably reduced in weight and size than before.

For example, as optical lenses for a telephoto lens mounted in a high-performance camera, a plurality of curved glasses have conventionally been used in layers. Therefore, the telephoto lens has increased in size and weight and has been difficult to handle. However, by the use of non-curved resin lenses, it has become possible to largely reduce the number of lenses to thereby reduce the weight and size of the telephoto lens so that everybody can easily handle it.

Complicatedly shaped transparent resin optical sheets or plates are used also in flat panel liquid crystal displays which have recently increased in demand. Without these transparent resin optical members, reduction in thickness and weight of the flat panel displays is impossible. Particularly, large-size flat panel liquid crystal displays each having a screen diagonal of 28 inches or more which have rapidly increased in demand recently have a feature that they are much thinner and lighter than CRTs currently predominant in the displays. Such a large-size flat panel liquid crystal display is an epochal display that is easy to carry about, can be hung on the wall, and is capable of realizing space saving in the room. The realization of the reduction in thickness and size owes to the existence of the transparent resin optical members. In this manner, the examples of application of transparent resins to the optical members have been improved intensively.

A transparent resin optical member is manufactured through processes of heating/melting, casting, and cooling/solidification by the use of a machine for normal resin molding such as injection molding or extrusion molding.

Recent resin optical members have been still more reduced in thickness, increased in size, and becoming finer in surface shape. In order to form a calculated optical shape in the resin molding machine, it has become necessary to reduce the viscosity of a molten resin to thereby ensure fluidity.

As a method of reducing the melting viscosity of a resin, there is a method of changing the properties of the resin itself, but a method of easily reducing the viscosity of the resin material is to raise the temperature during melting. However, raising the heating temperature of the resin also represents approaching a decomposition degradation temperature of the resin.

Transparency is important for an optical member. In the resin molding process, a resin that is heated to melt becomes more liable to be decomposed and degraded as the temperature rises. Further, when oxygen exists during high-temperature melting, the molten resin reacts with the oxygen to be easily oxidatively degraded.

Normally, the oxidative degradation temperature of a resin is lower than the decomposition degradation temperature thereof. The oxidatively degraded resin is subjected to coloring and a change in refractive index. Such a resin remains in a molded article as it is and becomes a contaminant to reduce the transparency and cause quality degradation. Further, a resin becomes more susceptible to oxidative degradation as a residence time thereof at high temperature increases.

The oxidatively degraded contaminant remaining in the molded article is called burn, sunspot, yellow, stones, fisheye, gel, or the like and is a major factor for molding failure.

Recently, as a countermeasure therefore, the inside of a resin molding machine is sealed with nitrogen or a resin molding machine with a structure for forcibly exhausting the air containing oxygen has been developed and utilized.

However, it is impossible to completely remove oxygen in the resin molding machine and thus to completely prevent the failure. Further, if the residence time in the high-temperature melting state is shortened, a non-molten resin is extruded into a molding article as it is to cause failure and, therefore, it is quite difficult to find the optimal molding conditions.

The cause of the occurrence of the oxidatively degraded matter such as the burn is associated with the surface roughness of materials of a cylinder, a screw, a nozzle, a die, and so on that contact with the molten resin, among members constituting the resin molding machine. If there are irregularities on the surfaces thereof, the molten resin stays at such portions over the long term, degrades, and peels off some time later to get mixed into a molding article. Therefore, normally, these surfaces are sufficiently polished. If it is still insufficient, plating or coating is applied to flatten the surfaces.

Further, even when the surface is sufficiently flattened, if affinity between the resin and the member surface is strong, adhesion and staying of the resin are liable to occur to cause the oxidative degradation thereof. This is a problem that also arises with a metal mold in an injection molding machine.

The oxidative degradation of the resin adhered to and staying on the member surface is accelerated by the catalytic properties of the surface. Further, it is possible that the plating or coating applied to the surface peels off physically or at times chemically and gets mixed into a molding article, which thus also causes failure. Therefore, it is necessary to sufficiently examine a material to be used for the surface. However, optimal measures that satisfy all have not yet been developed.

It is an object of this invention to provide a resin molding machine using a metal member applied with a treatment for a passive surface that has a low affinity with a resin, that is inactive, and that does not peel off, thereby preventing generation of a contaminant caused by degradation of a molten resin and introduced into a molding article so as to enable remarkable improvement in yield.

Further, it is an object of this invention to provide a member for a resin molding machine using a metal member applied with a treatment for a passive surface that has a low affinity with a resin, that is inactive, and that does not peel off, thereby preventing generation of a contaminant caused by degradation of a molten resin and introduced into a molding article so as to enable remarkable improvement in yield.

Moreover, it is an object of this invention to provide a member for a resin molding machine which is necessary for molding with high yield a resin optical molded article for a large-size flat panel liquid crystal display having a screen diagonal of 28 inches or more.

DISCLOSURE OF THE INVENTION

According to one mode of this invention, there is obtained a member for a resin molding machine serving to provide a surface that contacts a high-temperature molten resin, characterized in that the contacting surface is covered with an oxide coating film formed by directly oxidizing a base material or a component contained in the base material.

A metal that is used herein to enable formation of the oxide coating film is preferably a metal capable of forming a passive metal oxide and more preferably aluminum.

It is preferable that the metal to be the oxide coating film be one component in constituent components of the base material and be formed as the coating film by direct oxidation.

The content of the metal component for the formation of the passive oxide coating film in the base material is preferably 3 wt % to 7 wt % in the case of, for example, aluminum.

Further, the thickness of the metal oxide coating film formed according to any of the foregoing is preferably not less than 5 nm and not more than 100 nm.

A member for a molding machine of this invention is a member that is formed with a passive oxide coating film by contacting an oxidizing gas with a necessary surface of a base material thereof and carrying out a heat treatment. The oxidizing gas is preferably a gas containing oxygen or moisture.

By contacting the oxidizing gas containing oxygen or moisture with the base material, it is possible to easily form the passive oxide coating film.

The oxygen concentration used in the manufacturing is 500 ppb to 100 ppm and preferably 1 ppm to 50 ppm. The moisture concentration is 200 ppb to 50 ppm and preferably 500 ppb to 10 ppm. Further, a mixed gas containing hydrogen is more preferable.

In a forming method of this invention, the oxidation temperature is 700° C. to 1200° C. and preferably 800° C. to 1100° C.

BEST MODE FOR CARRYING OUT THE INVENTION

Hereinbelow, description will be given of a structure and operation according to this invention.

In the process of investigating a member for a resin molding machine where resin degradation during high-temperature melting hardly occurs, the present inventors have found out the following point and conceived this invention. That is, a member for a resin molding machine, in which a contacting surface thereof that contacts a high-temperature molten resin is covered with a passive oxide coating film formed by directly oxidizing a base material or a component contained in the base material, has a function of causing degradation of the molten resin to be difficult to occur even at high temperature over the long term as compared with other members.

Figure 1:
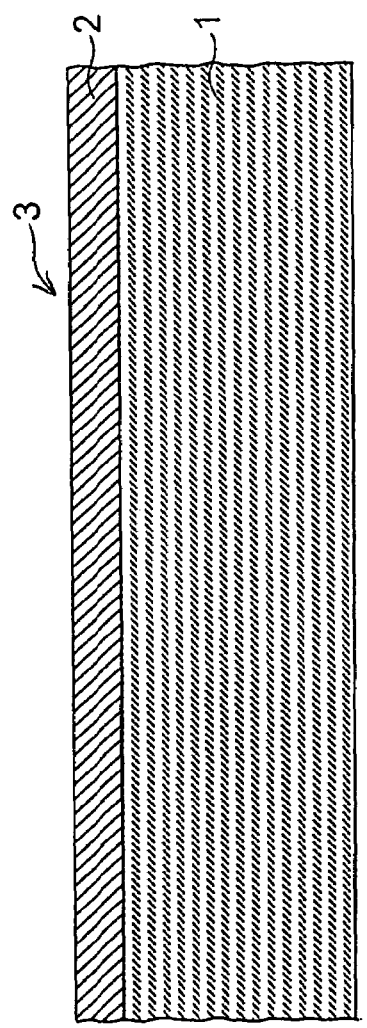
FIG. 1 is an exemplary diagram of a member for a resin molding machine applied with an oxide coating film of this invention.

At first, this invention will be specifically described. FIG. 1 is a partial schematic sectional view showing one example of a member for a resin molding machine of this invention.

A member 3 for a resin molding machine according to an embodiment of this invention shown in FIG. 1 has an oxide coating film layer 2 formed on one surface of a substrate 1. The illustrated substrate 1 is made of a normally used steel material such as a stainless steel or a carbon steel. However, the steel material to be used should contain therein a component that is capable of forming a passive oxide coating film.

The component contained in the steel material is preferably iron, cobalt, nickel, chromium, or aluminum that is capable of forming a passive oxide coating film. The metal to be oxidized is only one kind and, by selectively oxidizing such a metal, oxide arrays in the oxide coating film become regular and thus elaborate so that the oxide coating film becomes more stable.

Further, the component is preferably aluminum. To give one example, a stainless steel containing 3 wt % to 7 wt % aluminum can be cited. The average thickness of the illustrated oxide coating film layer is 5 nm to 100 nm. However, in order to prevent dielectric breakdown of the oxide coating film by conducting static electricity generated by friction at an interface between a molten resin and the member to a metal base material by the tunnel effect, the average thickness of the oxide coating film layer is preferably about 50 to 300 angstroms, i.e. about 5 nm to 30 nm.

Hereinbelow, description will be given, as one example, of a method of forming an oxide coating film of an aluminum-containing stainless steel.

By contacting an oxidizing gas with the surface of the aluminum-containing stainless steel and carrying out a heat treatment, it is possible to form a passive film made of an aluminum oxide and not containing an oxide film of another metal.

By forming the aluminum oxide passive film excellent in corrosion resistance on the surface of the aluminum-containing stainless steel, the conventional problem about workability and hardness has been overcome and it becomes possible to form the aluminum oxide passive film suitable for the member of the resin molding machine.

Further, the inexpensive and short-time processing is enabled as compared with conventional so that it is possible to realize an improvement in productivity of the aluminum oxide passive film processing.

According to a more specific forming method, an aluminum oxide passive film is formed by contacting an aluminum-containing stainless steel with an oxidizing gas containing oxygen or moisture.

In this event, the oxygen concentration is 500 ppb to 100 ppm and preferably 1 ppm to 50 ppm. The moisture concentration is 200 ppb to 50 ppm and preferably 500 ppb to 10 ppm.

An oxidizing mixed gas containing hydrogen in the oxidizing gas is more preferable.

The aluminum-containing stainless steel contains, in addition to aluminum, stainless steel components such as iron, chromium, and nickel. Accordingly, if the oxidizing component exists in large quantities, the other metals are also oxidized along with aluminum so that it is difficult to form an aluminum oxide passive film where no oxide films of the other metals exist. On the other hand, if the oxidizing component is too small in amount, since an oxide film cannot be formed, the other metals are not oxidized. By carrying out the processing in the foregoing oxidizing atmosphere where only the aluminum is oxidized, it is possible to form the aluminum oxide passive film. Further, even in a more excessive oxidizing atmosphere, hydrogen serving as a reducing component is added to thereby allow wide setting of the concentration of the oxidizing component in the oxidizing atmosphere.

Further, the addition of hydrogen makes it possible to form a more elaborate and strong aluminum oxide passive film.

The oxide coating film forming temperature of this invention is such that the oxidation temperature is 700° C. to 1200° C. and preferably 800° C. to 1100° C. In the method of forming the foregoing aluminum oxide passive film where no oxide films of the other metals exist, the oxidation is carried out at the foregoing temperature in order to selectively oxidize only aluminum so that oxidation of the other metals can be prevented. In the case of 700° C. or less, iron and chromium are also oxidized. On the other hand, in the case of 1200° C. or more, crystals of the aluminum oxide are deposited on the surface of the formed aluminum oxide passive film. In this case, when a fluid is supplied, the deposited crystals of the aluminum oxide peel off and cracks are generated, it is possible that the supplied fluid is contaminated. For this reason, the processing temperature is suitably 700° C. to 1200° C.

In the forming method of this invention, the oxidation time is 30 minutes to 3 hours. Since the time required for the formation of the aluminum oxide passive film is short like 30 minutes to 3 hours, it is not necessary to perform a heat treatment after aluminum coating as conventionally required and therefore it is possible to improve the productivity.

A pellet of a cycloolefin polymer being a colorless transparent resin was placed on the member for the resin molding machine of this invention having the oxide coating film produced as described above and its degradation behavior was examined.

For comparison, the resins were also placed on an iron member with no oxide coating film and a nickel-plated member in the same manner.

The members were gradually heated by the use of a hot plate. The resins were melted around a temperature exceeding 250° C.

While further raising the temperature, the resins placed on the iron member and the nickel-plated member started to be colored brown around a temperature exceeding 270° C.

On the other hand, the resin placed on the member for the resin molding machine having the oxide coating film of this invention maintained colorless and transparent.

When observing further closely, degradation of the resins placed on the iron member and the nickel-plated member were generated from the interfaces with the surfaces of those members. That is, it is easily imagined that those surfaces have some catalytic action to accelerate the degradation. On the other hand, the oxide coating film proves to be inactive against the molten resin.

The resins placed on those members were likewise heated to melt and cooled to solidify before the start of degradation and then the peelability of each solidified resin was examined. As a result, the resin solidified on the iron member was firmly adhered to the surface thereof and, when the resin was nipped and peeled off by the use of radio pincers, there were some remaining on the surface of the iron member. When the resin solidified on the nickel-plated surface was peeled off, a case was observed where even the nickel-plated surface was peeled off. On the other hand, when the resin solidified on the oxide coating film was nipped and peeled off by the use of the radio pincers, although there were some traces remaining on the surface thereof, it was possible to peel off the resin with no problem.

The member according to this invention is effective for any molding machine as long as it is a molding machine for use in resin molding.

The molding machine for use in resin molding represents a machine for performing resin molding, such as an injection molding machine, a transfer molding machine, an extrusion molding machine, a blow molding machine, a compression molding machine, or a vacuum forming machine.

Further, the member according to this invention is applicable not only to the molding machine for obtaining molded articles, but also to an extrusion molding machine, a melt kneading machine, a roll kneading machine, or the like for adding compounding agents or producing resin pellets.

The member of this invention is applied to a portion that contacts a molten resin in the molding machine.

Figure 2:
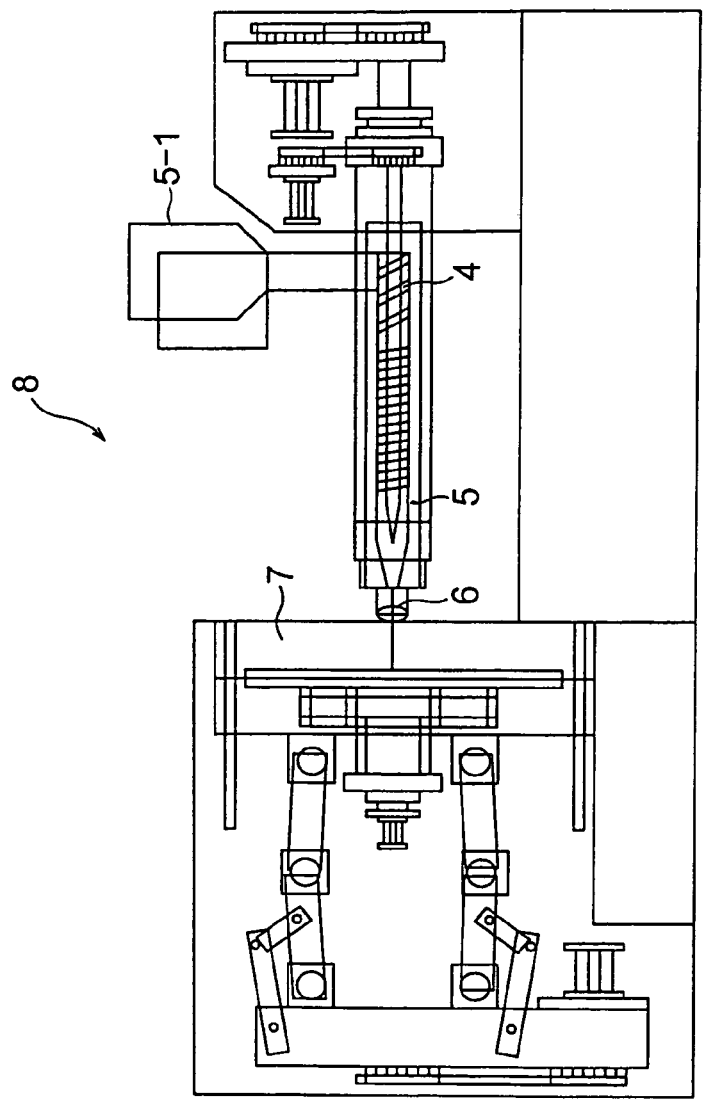
FIG. 2 is an exemplary diagram of an injection molding machine as one example that is applied with members for a resin molding machine of this invention.

FIG. 2 shows a structure of an injection molding machine 8 as one example. As illustrated, the injection molding machine 8 comprises a cylinder 5, a screw 4, a nozzle 6, and a metal mold 7. The cylinder 5 is supplied with a resin pellet from a hopper 5-1.

Among the constituent components of the injection molding machine 8, the screw 4, the cylinder 5, the nozzle 6, and the metal mold 7 contact a molten resin and therefore this invention is applied to these members. Although the injection molding machine is given as the example, this invention is also applicable to, other than the injection molding machine, a die and a roll of an extrusion molding machine and a screw and a roll of a kneading machine.

There is no particular limitation to a resin material that is used in the molding machine applied with the members of this invention, but this invention is particularly effective for a resin that is used for a transparent optical molded article such as an optical lens or prism, an optical sheet, or a reflecting plate, or a fine surface shape molded plate in which the failure cause to be solved by this invention occurs frequently.

Further, if the resin is a cycloolefin polymer, it is possible to make use of the effect to the maximum extent.

Figure 3:
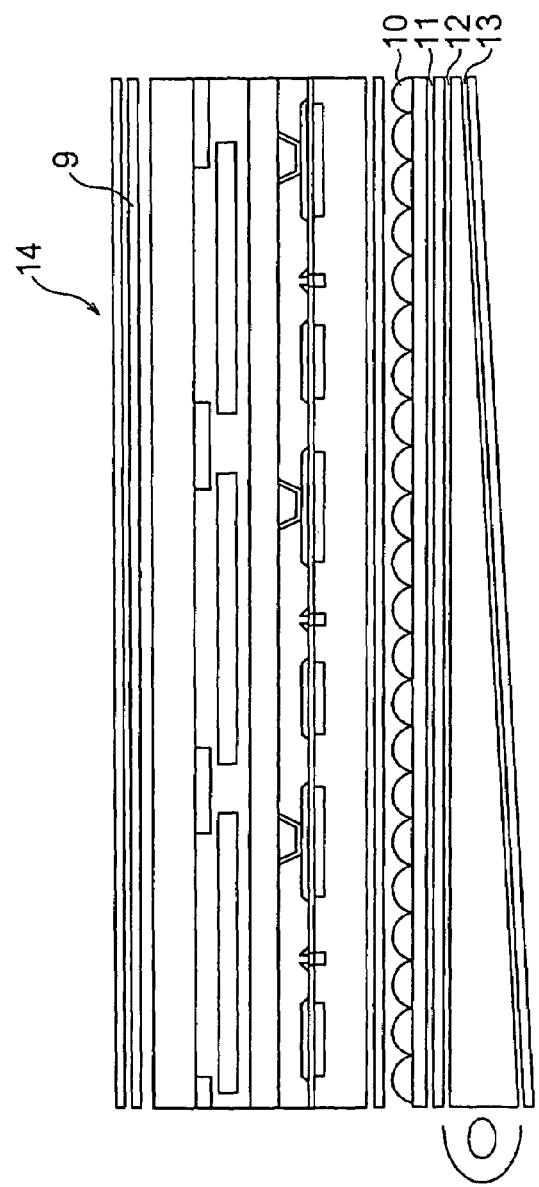
FIG. 3 is an exemplary diagram of a structure of a large-size flat panel liquid crystal display using molded articles each molded by the use of a resin molding machine employing members for a resin molding machine of this invention.

FIG. 3 shows a structure of a large-size flat panel liquid crystal display 14. The illustrated large-size flat panel liquid crystal display 14 has a first optical film 9 on one surface thereof and a second optical film 10 on the other surface thereof. On the back side of the second optical film 10 are provided a diffusion plate 11, a light guide plate 12, and a reflecting plate 13 which are all large-sized.

In the large-size flat panel liquid crystal display 14, transparent or precision molded articles are used for the large-size reflecting plate 13, the large-size light guide plate 12, and the large-size optical films 9 and 10.

The members according to this invention are particularly effective as members for a molding machine when molding a resin molding article for a large-size flat panel liquid crystal display having a screen diagonal of 28 inches or more, such as the large-size reflecting plate 13, the large-size light guide plate 12, or the first or second large-size optical film 9 or 10. Further, this invention is also applicable to molding of films of fluororesin, PFA (Tetrafluoroethylene-Perfluoroalkoxy Ethylene Copolymer), or fluorocarbon-based resin, and so on.

The member for the molding machine according to this invention is a member serving to provide a surface that contacts a high-temperature molten resin and characterized by causing degradation of the molten resin to be difficult to occur even at high temperature over the long term as compared with other members. In this case, there are obtained members for a molding machine that are each covered with a passive oxide coating film formed by directly oxidizing a base material or a component contained in the base material and, by carrying out the molding by the use of the resin molding machine employing these members, it is possible to obtain highly accurate resin molded articles.

INDUSTRIAL APPLICABILITY

This invention is applicable not only to a machine for performing resin molding, such as an injection molding machine, a transfer molding machine, an extrusion molding machine, a blow molding machine, a compression molding machine, or a vacuum forming machine, but also to an extrusion molding machine, a melt kneading machine, a roll kneading machine, or the like for adding compounding agents or producing resin pellets.

The invention claimed is:

1. A resin molding machine comprising:
a metallic member comprising a base material and components contained in said base material, and having inner surfaces, at least part of the inner surfaces that contact a molten resin is covered with an oxide coating film in the form of any one of an oxide of said base material and an oxide of a part of the components, in which at least a part of said machine is comprised of stainless steel containing 3 wt % to 7 wt % aluminum.

2. A resin molding machine according to claim 1, wherein said oxide coating film is a passive metal oxide film.

3. A resin molding machine according to claim 1, wherein said base material is aluminum or iron containing at least aluminum and said oxide coating film is an alumina film formed by directly oxidizing said base material.

4. A resin molding machine in which at least a part of said machine is comprised of stainless steel containing 3 wt % to 7 wt % aluminum, wherein, of inner surfaces of said stainless steel, at least part of the surfaces that contact a molten resin is covered with an alumina passivation film selectively formed by contacting an oxidizing gas with a surface of said stainless steel and performing a heat treatment.

5. A resin molding machine according to any of claims 1 to 4, wherein said metallic member is at least one of a screw, a cylinder, a nozzle, a metal mold, a die, and a roll.

6. A resin molding machine according to claim 3 or 4, wherein said alumina film has a thickness of 5 nm to 100 nm.

7. A resin molding machine according to claim 3 or 4, wherein said alumina film has a thickness of 50 to 300 angstroms.

8. A metallic member for a resin molding machine in which at least a part of said machine is comprised of stainless steel containing 3 wt % to 7 wt % aluminum, wherein, of inner surfaces of said metallic member, at least part of the inner surfaces that contacts a molten resin is covered with an oxide coating film in the form of any one of an oxide of a base material of said metallic member and an oxide of a part of components contained in said base material.

9. A metallic member for a resin molding machine according to claim 8, wherein said oxide coating film is a passive metal oxide film.

10. A metallic member for a resin molding machine according to claim 8, wherein said base material is aluminum or iron containing at least aluminum and said oxide coating film is an alumina film formed by directly oxidizing said base material.

11. A metallic member for a resin molding machine in which at least a part of said machine is comprised of stainless steel containing 3 wt % to 7 wt % aluminum, wherein, of inner surfaces of said stainless steel, at least part of the surface that contacts a molten resin is covered with an alumina passivation film selectively formed by contacting an oxidizing gas with a surface of said stainless steel and performing a heat treatment.

12. A metallic member for a resin molding machine according to claim 10 or 11, wherein said alumina film has a thickness of 5 nm to 100 nm.

13. A metallic member for a resin molding machine according to claim 10 or 11, wherein said alumina film has a thickness of 50 to 300 angstroms.

* * * * *